(No Model.)

E. C. JONES.
SAFETY DEVICE FOR GAS OR AIR PIPES.

No. 424,305. Patented Mar. 25, 1890.

Witnesses
Mattie J. Jackson
Geo. W. White

Inventor
Edward C. Jones
by Allan Andrew, his atty

UNITED STATES PATENT OFFICE.

EDWARD C. JONES, OF BOSTON, MASSACHUSETTS.

SAFETY DEVICE FOR GAS OR AIR PIPES.

SPECIFICATION forming part of Letters Patent No. 424,305, dated March 25, 1890.

Application filed August 9, 1889. Serial No. 320,234. (No model.)

*To all whom it may concern:*

Be it known that I, EDWARD C. JONES, a citizen of the United States, and a resident of Boston, in the county of Suffolk and State of Massachusetts, have invented new and useful Improvements in Safety Devices for Gas or Air Pipes, of which the following, taken in connection with the accompanying drawings, is a specification.

This invention relates to improvements in safety devices for gas or air pipes; and it has for its object to prevent explosions of illuminating, producer, or heating gases when accidentally mixed with atmospheric air while being conveyed from the gas-works to the holder or consumer.

Producer-gas for heating purposes when mixed with a small quantity of atmospheric air forms a very explosive compound when brought in contact with a light or fire, and when a leak occurs in the pipe a very dangerous accident may happen, causing injury to the pipes or their surroundings if the escaping gas is ignited.

The invention, although particularly designed for preventing explosions in producer-gas pipes, is also very well adapted for blast-pipes of water-gas generators for the purpose of preventing the gas from the generator from backing into the blast air-pipe and exploding the compound gas.

In fact, the invention is useful for any and all purposes where there is any danger of explosions from illuminating or heating gases being mixed with atmospheric air in the right proportion for causing an explosion when brought in contact with a fire.

The invention is constructed as follows, reference being had to the accompanying drawings, where—

Figure 1:
Figure 2:
Figure 3:
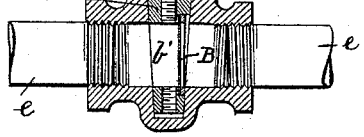
Figure 4:
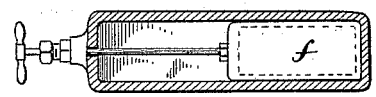
Figure 5:
Figure 6:
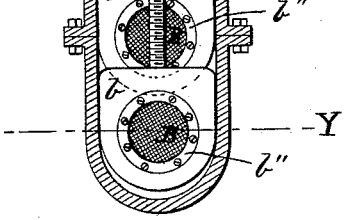

Figure 1 represents a vertical section of a valve provided with my improved safety device. Fig. 2 represents an end view of the same, parts of which are shown in section. Fig. 3 represents a modification of the device, showing, in connection with the safety-plug, a cut-off or slide arranged at a right angle to said plug for the purpose of allowing the safety-plug to be cleaned or repaired without shutting off the gas-supply from the pipes. Fig. 4 represents a horizontal section on the line X X. (Shown in Fig. 3.) Fig. 5 represents an end view and partial section of a modification, showing a pair of safety-plugs arranged side by side within the valve-chest for the purpose of substituting one plug for the other in case the plug in use should become foul or clogged up; and Fig. 6 represents a cross-section on the line Y Y in Fig. 5.

Similar letters refer to similar parts wherever they occur on the different parts of the drawings.

$a$ represents a valve-shell of any well-known form or construction having on its interior seats against which a vertically-sliding plug $b$ is adapted to be lowered by means of a screw-shaft $c$ and hand-wheel $d$, and which is also adapted to be raised out of the way, for a purpose hereinafter specified. I do not, however, limit myself to any particular means for lowering and raising the valve, as it will be obvious that other means may be employed.

$e\ e$ represent the gas-supply pipes as usual connected in a suitable manner to the ends or flanges of the valve-shell. The plug $b$ has a transverse perforation $b'$ of a size about equal to the interior bore of the pipes $e$, which perforation coincides with the pipes $e\ e$ when the plug $b$ is closed against its seat, as shown in Figs. 1 and 2. The said perforation is covered by a fine wire gauze or netting B, which is preferably secured to said plug by means of a ring $b''$ and suitable fastening-screws, as shown in Fig. 2; but this is not essential, as said wire gauze or netting may be secured to the plug for the purpose of covering its perforation in any other suitable or equivalent manner.

It is well known that wire gauze or netting serves as a means to prevent explosion of gases from passing by such wire screen, and thus it will be seen that by the arrangement, as shown and described, an explosion of gas taking place from any cause on one side of the valve and its wire gauze or netting will be prevented from going beyond the latter, thus preventing accidents and damage. Should the wire gauze or netting become foul or clogged with impurities all that is necessary to do is to raise the plug $b$, so as to establish a free passage for the gas through the valve-shell until such time when it may be convenient to shut off the gas-pressure for the purpose of cleaning the plug-screen or replacing it with a fresh one, as the case may demand.

The modification shown in Figs. 5 and 6 is substantially like the one shown in Figs. 1 and 2, with the difference that in the said Figs. 5 and 6 I have shown the valve-shell provided with two plugs of the kind described, instead of one only, as shown in Figs. 1 and 2, each of said plugs being operated independent of the other to enable one to be used at a time, the other one being raised out of position, as shown.

When one plug becomes foul or clogged, the other one is forced against its seat and the first one raised out of position, thus enabling the safety device to be used a longer time as compared with the device shown in Figs. 1 and 2, where only one plug and netting is shown.

In Figs. 3 and 4 the device is substantially like that shown in Figs. 1 and 2, with the addition of a solid gate or cut-off $f$, arranged at a right angle to the perforated plug $b$, so as to permit the latter to be raised, when foul or clogged, to the position shown in Fig. 3, after which the horizontal gate $f$ is closed, as shown, enabling the operator to remove the top of ths valve-shell above the gate $f$, as well as the plug $b$, for the purpose of cleaning the wire gauze or netting B without the need of shutting off the gas-supply from the pipes $e\ e$.

Having thus fully described the nature, construction, and operation of my invention, I wish to secure by Letters Patent and claim—

The combination, with a valve-shell, of a plug arranged therein, said plug having a transverse orifice provided with a wire gauze or netting and adapted to be raised and lowered, and a horizontal gate $f$, substantially as and for the purpose described.

In testimony whereof I have signed my name to this specification, in the presence of two subscribing witnesses, on this 2d day of August, A. D. 1889.

EDWARD C. JONES.

Witnesses:
ALBAN ANDRÉN,
MARTHA J. JACKSON.